United States Patent
Sievers et al.

(10) Patent No.: US 6,599,461 B1
(45) Date of Patent: Jul. 29, 2003

(54) METHOD FOR PRODUCING NONSLIP FLOOR COVERINGS

(76) Inventors: Thomas Sievers, Dorfstrasse 22, D-21379, Boltersen (DE); Günter Wiedemann, Luchbergstrasse 14, D-01237 Dresden (DE)

( * ) Notice: Subject to any disclaimer, the term of this patent is extended or adjusted under 35 U.S.C. 154(b) by 0 days.

(21) Appl. No.: 09/403,325
(22) PCT Filed: Apr. 9, 1998
(86) PCT No.: PCT/DE98/01023
§ 371 (c)(1), (2), (4) Date: Dec. 7, 1999
(87) PCT Pub. No.: WO98/46405
PCT Pub. Date: Oct. 22, 1998

(30) Foreign Application Priority Data

Apr. 16, 1997 (DE) .......................... 197 15 937

(51) Int. Cl.⁷ .................... B23K 26/00; B28D 1/00; B05D 1/02
(52) U.S. Cl. ................. 264/400; 264/40.1; 264/233; 264/341; 264/482; 219/121.68; 219/121.69; 134/15; 134/26; 134/27; 134/42; 216/30; 216/92
(58) Field of Search .................. 264/400, 232, 264/341, 344, 233, 40.1; 216/30; 46/92; 134/15, 26, 27, 42

(56) References Cited

U.S. PATENT DOCUMENTS

| 3,318,207 A | 5/1967 | Whiteside | 94/22 |
| 3,847,688 A | 11/1974 | Gillice | 156/2 |
| 4,339,296 A | * 7/1982 | Gursky et al. | 156/345 |
| 5,223,168 A | 6/1993 | Holt | 252/142 |
| 5,423,910 A | 6/1995 | Schiller | 106/36 |
| 5,637,236 A | * 6/1997 | Lowe | 216/39 |
| 5,902,411 A | * 5/1999 | Williams et al. | 134/3 |
| 5,942,181 A | * 8/1999 | Rondeau | 264/504 |
| 6,117,499 A | * 9/2000 | Wong et al. | 427/599 |

FOREIGN PATENT DOCUMENTS

| DE | 2053110 | 5/1972 |
| DE | 2220378 | 11/1973 |
| DE | 3139427 A1 | 9/1982 |
| DE | 3342266 A1 | 5/1985 |
| DE | 3545064 A1 | 6/1987 |
| DE | 3933843 C2 | 9/1991 |
| DE | 4235333 C1 | 3/1994 |
| DE | 19518270 C1 | 8/1996 |
| WO | WO96/36469 | 11/1996 |

OTHER PUBLICATIONS

Technik Trittsicherheit durch Lasertechnik, Naturstein 180–182, 12/96.

* cited by examiner

*Primary Examiner*—Stefan Staicovici
(74) *Attorney, Agent, or Firm*—Young & Basile, P.C.

(57) ABSTRACT

The invention relates to a method of manufacturing non-slip floor coverings made of mineral materials, such as, for example, natural stone, fine stoneware, artificial stone or ceramics. This method is carried out in a two-stage process, there being produced on the surface of the floor coverings or slabs, in a first process stage by means of pulsed laser bombardment, statistically distributed microcraters invisible to the human eye. The surface of the floor coverings or slabs obtained in this way is then, according to the invention, subjected to hydromechanical aftertreatment.

28 Claims, 1 Drawing Sheet

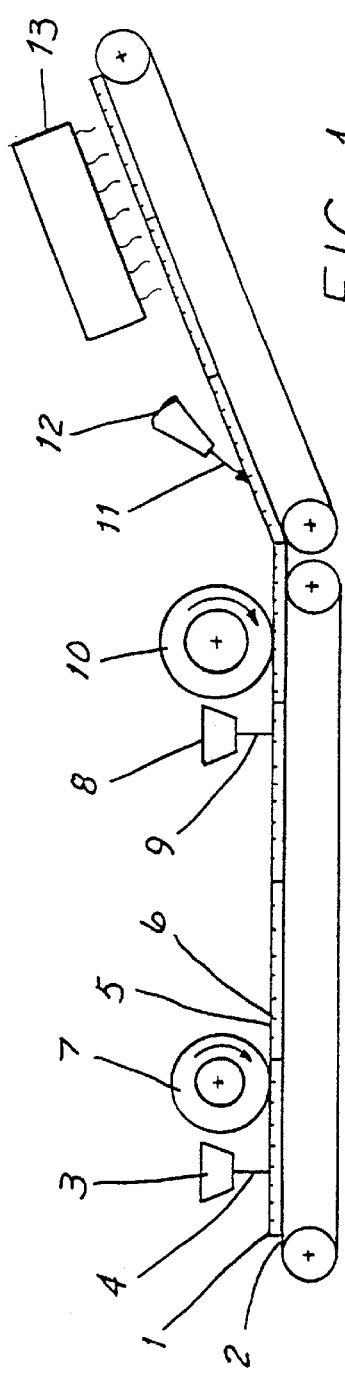
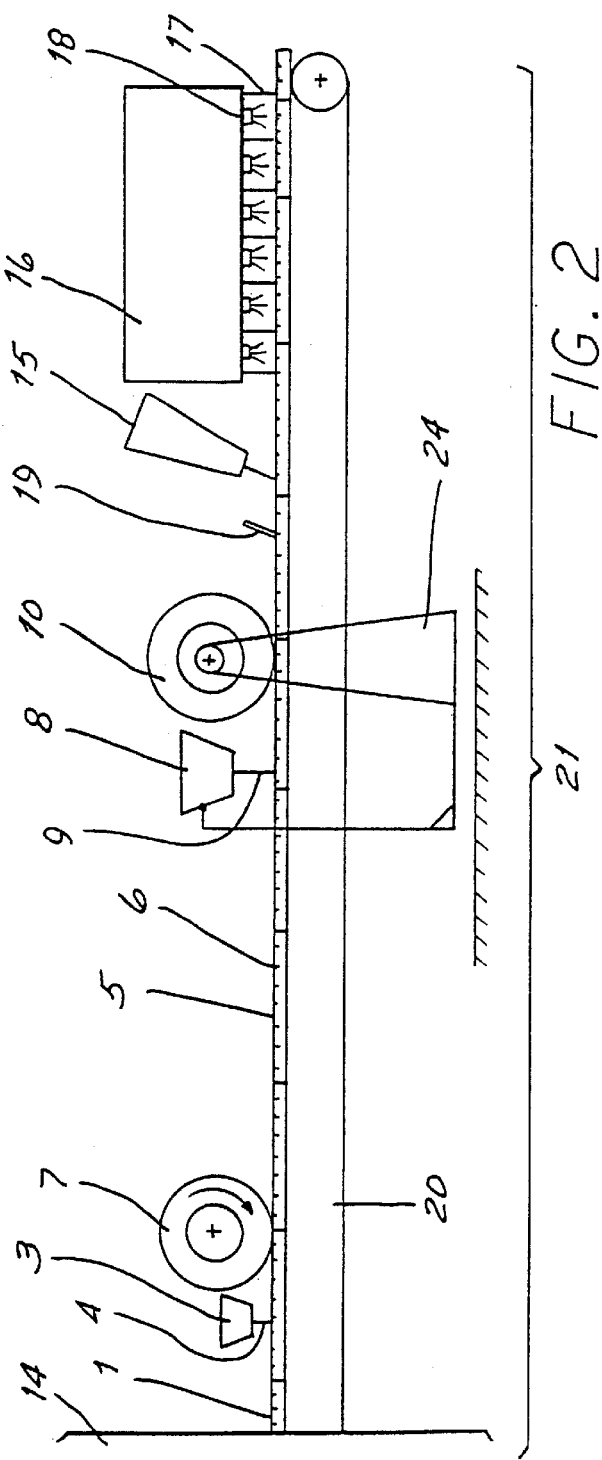

METHOD FOR PRODUCING NONSLIP FLOOR COVERINGS

BACKGROUND OF THE INVENTION

The invention relates to a method of manufacturing non-slip floor coverings made of mineral materials, such as, for example, natural stone, fine stoneware, artificial stone or ceramics.

A special area of application for the invention is to increase or produce an anti-slip effect on highly polished floors, especially those used in public buildings or in buildings accessible to the public, as well as in those areas where liquids of every kind can land on the floor.

Slipping is one of the most frequent causes of accidents in Germany. The severity of such accidents is usually underestimated. To increase safety underfoot, shoe-soles and floors must be designed to be anti-slip. This is necessary above all where media which encourage slipping land on the floor. In many areas of public life, but also in the private domain, it is usual to use polished, shiny natural stone and artificial stone slabs as typical floor coverings both in dry and wet areas and in transitional areas. What is important here is to bring the anti-slip characteristics into harmony with the architectonic aesthetics. The evaluation of the anti-slip effect takes place according to DIN 51097—(Determining the anti-slip property—barefoot regions subject to wetness—inspection procedures—inclined plane) and DIN 51130 (Determining the anti-slip property—workrooms and work areas with increased danger of slipping—inspection procedures—inclined plane) by means of an inclined plane.

However, there also exist measuring implements for the non-stationary measurement of the coefficient of friction. [Fb 701 Comparative study of the non-stationary measurement of the coefficient of friction on floors (Schriftenreihe der Bundesanstalt für Arbeitschutz)].

There exist different methods of producing or increasing the anti-slip properties of floors made of natural or artificial stone. The use of these methods is predominantly dependent on where the floor covering is to be laid or is already laid (inside area, outside area, degree of soiling to be expected, amongst other things). The most important methods will be briefly described below.

In abrasive blasting, abrasive-blasting materials corresponding to the desired roughness are hurled against the surface at high pressure. The more or less hard abrasive-blasting material leads to irregular roughening and severe dulling of the surface (DE 31 39 427).

In flame-blasting, high-energy fuel-gas oxygen flames are produced with which the surface to be treated is briefly heated. Through the action of the flames, there is a bursting of the quartz in the uppermost region of the stone as well as melting of stone portions which then solidify like glass and adhere to the surface relatively loosely (DE 35 45 064).

The granulation takes place with the use of a granulating tool (granulating hammer) which is provided with a plurality of evenly arranged chisel points. During a continuous movement of the workpiece, the granulating hammer is struck against the surface with a certain frequency (DE 39 33 843).

The described, or similar, methods which use abrasive means or chisel-like tools, admittedly lead to an increase in safety underfoot, but, like other surfaces, for instance those which are less polished during manufacture, also to a considerable loss of brightness and thus a reduction in their aesthetic appeal.

The coating of surfaces in order to increase their non-slip quality has the consequence that the treated surface is provided with burls (DE 33 42 266). This method does not admittedly bring with it any alteration of the visual characteristics but is only of limited durability since it is not possible to avoid abrasion.

In the chemical etching treatment of natural stone surfaces, above all the feldspar portions are attacked by the effect of substances containing hydrofluoric acid. (Informationsblatt des Bundesverbandes Trittsicherheit, Abteilung Öffentlichkeitsarbeit). The damage only amounts to a few micrometers, the quartz is largely spared. The loss of brightness depends on the length of the action; the alteration of the whole appearance must be tested on a sample surface.

However, this method is largely limited to being applied to mineral floor coverings. Chemical composition and concentration must be adapted to the different types of coverings. Because of the long reaction times and the necessity of keeping to the exact concentration, this method cannot be integrated into the process of manufacturing floor slabs or flags, or only with very high outlay. Where there is inappropriate application and disposal of the substance containing hydrofluoric acid, there is an increased risk to workers' safety and the conservation of the environment.

In DE 195 18 270 or WO 96/36469, a non-slip floor covering and a method of manufacturing same are likewise described, the anti-slip effect being achieved here in that a dense net of microcraters, which are supposed to be invisible to the human eye, is produced on the surface of the floor covering, preferably polished slabs of natural stone or fine stoneware, by means of laser irradiation. This solution represents a clear improvement on the preceding state of the art.

An increase in the anti-slip effect, however, such as is desirable, e.g. in certain wet areas, can admittedly be achieved with laser irradiation by increasing the density of the craters and enlarging the lateral extension and the depth of the craters.

What is disadvantageous here, however, is that there can then be clear impairment of the visual characteristics, or a loss of brightness. A further disadvantage is that an increase in crater density and dimensions is connected with a lowering of the process speed. Often the peak pulse power achievable with a conventional pulsed laser is not sufficient to increase the crater dimensions.

SUMMARY OF THE INVENTION

Thus, the object of the invention is to propose a method of manufacturing non-slip floor coverings. with the aid of which method an increase in the anti-slip effect can be achieved without there being any disadvantageous impairment of the typical surface characteristics on the one hand and without any lowering of the process speed occurring, and in which, moreover, all the advantages of the laser structuring over other methods of providing an anti-slip surface are retained.

According to the invention, this object is achieved with a method as disclosed hereafter.

It is essential here that the non-slip floor covering, obtained in known fashion as per DE 195 18 270 or WO 96/36469 is subjected to continuous hydromechanical aftertreatment. This hydromechanical aftertreatment can preferably take place in the same installation directly following the laser treatment and retaining the same process speed, whereby the whole process, which comprises two process stages (laser treatment and hydromechanical aftertreatment), can be carried out continuously.

In certain cases however, e.g. when laser-treated floor coverings only receive the hydromechanical aftertreatment at the place of installation, it can also be propitious for the two process stages to run separately, i.e. not continuously.

Advantageous developments of this whole process are represented hereinafter.

In accordance with the method according to the invention, the laser-treated surface of the floor coverings or slabs conveyed horizontally are briefly sprayed at least once with an acid, preferably slightly acid, liquid during the continuous advance of the slabs.

After each of these spraying operations, the spray liquid is preferably distributed by means of brushes or a wiper blade evenly on the surface of the floor coverings or slags and superfluous spray liquid is removed.

This even distribution preferably comes about in such a way that the spray liquid only remains in the depressions and in the microcraters produced by the laser treatment, but not on the polished surface of the floor coverings or slabs. Here the dosage of the liquid is chosen to be an amount corresponding approximately to the volume of the depressions and microcraters.

As a result of the effect of the laser, the surface of the craters is microscopically very rough and thus very large in relation to the volume of the craters. This produces very good conditions in which the dilute acid can work in the craters produced by the laser treatment and in the micropores which, depending on the type of slab, are present despite the polish. The pH-value and the reaction time of the substantially diluted acids by comparison with the chemical engineering treatment of floor coverings are selected according to the invention to be such that the polished surface is not impaired yet, inside the craters, because of the good reaction conditions, parts of the surface are etched and thus there is an increase in volume. By preference, those craters which are located in the region of the feldspar portions of the natural stone or fine stoneware slabs are enlarged.

It is important to mention at this point that the reaction of time of the acid spray liquid depends on many factors, especially the process speed the distance between the first and the last of the spraying operations serving to cleanse the surface from any preceding spray operations and the concentration of the acid.

What is important is that the acid, which in individual types of application can also be concentrated, only affects the depressions and microcraters without any impairment of the rest of the polished surface.

After the hydromechanical processing and the subsequent short (lasting preferably between 60 and 150 s) reaction time of the acid in the craters, the slabs are then sprayed again with a liquid, here at the highest possible pressure, and brushed once more. Corresponding to the pH-value of the first liquid, the liquid to neutralise completely can be water or also slightly basic (for example diluted lye).

In this connection, an advantageous development can consist of the fact that the pH-value of the liquid running off can be determined continuously and this value used as the regulating variable for the pH-value of the spray liquid.

Through the mechanically stronger effect of the brushes in relation to the distribution of the acid, residues which no longer belong to the particle bond of the mineral components of the floor slabs and which would otherwise lead to a decrease in the possible crater volume, are removed from the craters at the same time.

After the washing or neutralisation process, the slabs are dried with hot air.

The big advantage of the method according to the invention consists in fact that, using this method, the advantages of the laser-structured floor coverings and slabs are preserved and the anti-slip effect is noticeably increased.

BRIEF DESCRIPTION OF THE DRAWINGS

FIG. 1 is a schematic view of a process line for the manufacturing of a non-slip floor covering accorded to the present invention; and FIG. 2 is a schematic view of an alternative process line for the manufacturing of a non-slip floor covering.

DESCRIPTION OF THE PREFERRED EMBODIMENT

The invention is to be explained in greater detail via the following embodiments, given by way of example.

Embodiment 1

The method variant as per embodiment 1 is sketched in FIG. 1. Delivered floor slabs, made of fine stoneware and equipped with an anti-slip finish by means of pulsed laser bombardment and measuring 60×60×1.5 cm, are subjected in an installation to aftertreatment as per the method according to the invention. The slabs 1 are here moved on a conveyor belt 2 at a relatively high speed of 3 m/min. A liquid 4 containing diluted hydrofluoric acid, with an acid concentration of 50% of the maximum possible, is applied to a polished slab surface 5 with the microcraters 6 by a spray beam 3 via a 58 cm wide row of hole-type nozzles. At a spacing of 10 cm in the running direction of the slabs behind the spray beam, there is located a rotating brush 7 with soft bristles. The rotating brush 7 distributes the liquid 4 evenly into the microcraters 6 and into the natural depressions of the slab 1 and simultaneously removes superfluous acid from the surface 5. At a spacing of 50 cm from the spray beam 1, there is located a second spray beam 8 which applies to the slab surface 5 a diluted lye 9 corresponding to the concentration of the acid used, in order to neutralise it. In analogous fashion to spray beam 3, there is also located behind spray beam 8 a rotating brush 10, which, however, runs at a higher rotational speed and has greater contact pressure. Thus, in addition to the distribution and intensification of the neutralisation of the spray liquid 4, there is simultaneous removal of the liquids from the depressions and from the slab surface. Directly behind the brush 10, the slabs 1 run obliquely upwards at an angle of 30°, and a jet of compressed air 11 is directed at the slab surface from a slot-type nozzle 12, against the direction of movement, at an angle of 30° to the slab surface, this air jet removing any remaining liquid residue both from the surface 5 and from the microcraters 6 and other depressions. Thereafter, the slabs are dried (e.g. removal of the remaining moisture from the possible pore spaces) by one or more hot-air appliances 13 and the slabs 1 are conveyed onwards, e.g. to a packing station.

Embodiment 2

The method variant as per embodiment 2 is sketched in FIG. 2. From a work station 14 at which the anti-slip finish is applied through the targeted production of microcraters 6 by means of pulsed laser bombardment, the laser-treated granite slabs 1, measuring 30×30×1 cm and in 2 rows beside one another, i.e., with a total width of 60 cm, pass continuously on a conveyor belt 20 to the aftertreatment section 21. The rate of feed of the slabs 1, technologically determined by the laser treatments, amounts to 0.6 m/min. Before the drying section 16, the slabs 1 first of all pass underneath a spray beam 3, which is again equipped with a 58 cm wide row of hole-type nozzles, however the nozzle holes are smaller in diameter than those of example 1 by a factor of 5. Here a liquid 4 containing diluted hydrofluoric acid, with an acid concentration of 10% of the maximum possible, is sprayed on to the polished slab surface 5 with the microcraters and the natural depressions 6. The total amount of the liquid 4 sprayed on is only approximately 15% greater than the volume of the already existing craters and depressions. At a spacing of approx. 15 cm in the running direction behind the spray beam 3, there is located a rotating brush 7 with soft bristles. The brush axis is in this case disposed at an angle of 80° to the forward feed device. The rotating brush distributes the liquid 4 evenly into the microcraters and natural depressions 6 and removes the superfluous liquid from the surface. At a spacing of, in this case, 1 meter from spray beam 3, there is located an additional spray beam 8, which sprays on to the slab surface 5 a lye 9 diluted corresponding to the concentration of the acid used and the sprayed-on amount, higher than the acid by a factor of 10. Directly behind the spray beam 8, there is located, here too, a rotating brush 10, in an analogous arrangement to 7. Said brush is equipped with harder bristles, runs at a rotational speed ten times higher than that of brush 7 and is pressed harder against the slab surface. Spray beam 8 and brush 10 are mounted on a common device 24 the distance between which the spray beam 3 can be adjusted. This is required at a given process speed in order to vary the necessary reaction time corresponding to the desired degree of intensification of the anti-slip finish and taking into consideration different slab materials. Following the last spraying and brushing processes, another spraying operation takes place with water being sprayed from a slot-type nozzle 15 with a volume flow of 10 l/min on to the slab surface 5. What is achieved by this is that possible remains of the already neutral mixture of liquids 9 and 4 and any possible last remains of mechanical contamination and residue are completely removed from the slab surface 5 and from the microcraters and depressions 6. Thereafter, the slabs run through a drying section 16, where the slabs are dried by having warm air from hot-air appliances 17 blown on to them and by infrared irradiation 18. Between the working area of the brush 10 and the slot-type nozzle 15, and between the slot-type nozzle 15 and the drying section 16, there are located in each case plastic wiper blades 19 which act as wipers for the liquids.

It is obvious that in each case after the individual wet sections (1st and 2nd spraying and brushing process, spraying operation) the liquids are collected separately and subjected to aftertreatment, and after the corresponding preparation are led again into the circulation or the waste water removal system.

What is claimed is:

1. Method for manufacturing non-slip floor coverings or floor slabs, the non-slip floor coverings or slabs made of mineral materials having depressions in a 2-stage process by means of pulsed laser bombardment, there being produced, statistically distributed, on the surface of the floor covering, through the targeted action of laser pulses, microcraters acting like suction cups which are invisible to the human eye, characterized in that, in a second process stage, the surface of the laser-structured floor coverings or slabs so produced is subjected to purposeful hydromechanical post-treatment, it being represented that the hydromechanical post-treatment comes about in such a way that the surface of the laser-structured floor coverings or slabs is sprayed with liquid at least twice providing at least two spraying operations, at least one spraying operation serving to etch parts of the surface of the microcraters and thus enlarge same, and wherein of the at least two spraying operations, the last spraying operation serves to at least one of clean and neutralise the surface of the floor coverings or slabs from previous spray liquids.

2. Method according to claim 1, characterised in that the hydromechanical post-treatment is only carried out in the depressions of the floor coverings or floor slabs.

3. Method according to claim 2, characterised in that the hydromechanical post-treatment is only carried out in the microcraters produced by means of laser pulses.

4. Method according to claim 1, characterized in that after each spraying operation at least one process takes place in which the spray liquid is evenly distributed on the surface of the floor coverings or floor slabs and excess spray liquid is removed from this surface, and finally at least one drying process is carried out.

5. Method according to claim 1, characterized in that the hydromechanical post-treatment happens in such a way that the surface of the floor coverings or slabs is sprayed twice with liquids, the second spraying operation serving to one of cleanse and neutralize the surface of one of the floor coverings and slabs from the first spray liquid, after each of the first and the second spraying operations a process taking place in which the spray liquid is distributed evenly on the surface of the floor coverings or slabs and excess spray liquid is removed from this surface, and finally at least one drying process being carried out.

6. Method according to claim 1, characterized in that, in one or more of the spraying operations serving to etch and thus enlarge the surface of the microcraters, an acid is used as the spray liquid.

7. Method according to claim 6, characterised in that an inorganic acid is used as the acid.

8. Method according to claim 7, characterised in that a halogen hydracid is used as the acid.

9. Method according to claim 8, characterised in that hydrofluoric acid (HF-acid) is used as the acid.

10. Method according to claim 7, characterized in that the acid used is a dilute acid.

11. Method according to claim 10, characterised in that the acid used is in an aqueous solution with a concentration of a maximum of 50% of its maximum concentration in water.

12. Method according to claim 11, characterised in that the acid used is in an aqueous solution with a concentration of a maximum of 10% of its maximum concentration in water.

13. Method according to claim 1, characterised in that the spray liquid of the last spraying operation is neutral or basic.

14. Method according to claim 13, characterised in that the pH-value of the spray liquid of the last spraying operation is a maximum of pH 9.

15. Method according to claim 14, characterised in that the spray liquid of the last spraying operation is water (pH-value=7), the amount of water used being greater than the amount of spray liquid in the immediately preceding spraying process.

16. Method according to claim 1, characterized in that, after the last spraying operation, a process is carried out with the aid of which the spray liquid of the last spraying process is removed from the surface, the depressions and the microcraters of the surface of the floor coverings or slabs, without leaving any residue.

17. Method according to claim 16, characterized in that the spray liquid of the last spraying operation is removed from the surface of the floor coverings or slabs by means of a jet of gas.

18. Method according to claim 4, characterized in that, with the exception of the last spraying operation, the process of evenly distributing the respective spray liquid on the surface of the floor coverings or slabs is carried out in such a way that the respective spray liquid remains only in the depressions or microcraters, not however on the rest of the surface.

19. Method according to claim 18, characterised in that, with the exception of the last spraying operation, the distribution of the respective spray liquid and the removal of the surplus spray liquid takes place by means of at least one of a brushing process and a doctor blade.

20. Method according to claim 4, characterized in that the spray liquid is completely removed from the polished surface of the floor coverings or slabs and the depressions and microcraters.

21. Method according to claim 20, characterised in that even distribution takes place by means of a brushing process.

22. Method according to claim 4, characterized in that the final drying takes place by means of hot-air appliances.

23. Method according to claim 22, characterised in that the drying takes place by means of hot-air appliances fed with the warmed and filtered exhaust air and from infrared irradiation.

24. Method according to claim 1, characterized in that the whole method in the first and second process stages can be carried out continuously in one installation, in this case the speed of the passage of the floor coverings or slabs through the whole process, including the reaction times of the respective spray liquids on the floor coverings or slabs, being determined by the speed of the first process stage (laser treatment), and in that, with the exception of the last spraying operation, strong undiluted acids are used as the spray liquid, and the spray liquid of the last spraying operation is adapted to neutralize the surface of the floor coverings or floor slabs.

25. Method according to claim 1, characterized in that the pH-value of the liquid flowing out of the last spraying operation is measured and is used as the regulating variable for the basicity of the last spray liquid.

26. Method according to claim 1, wherein a pH value is continuously determined of the first of the at least two spraying operation for regulating a pH value of the spray liquid of the last spraying operation.

27. In a method for the manufacturing of non-slip floor coverings or floor slabs, the non-slip floor coverings or slabs made of mineral materials having depressions in a two-stage process including the steps of bombarding the floor coverings or floor slabs with a pulsed laser, forming and statistically distributing microcraters on the surface of the floor coverings or floor slabs through the targeted action of laser pulses, the microcraters acting like suction cups, invisible to the human eye, to form laser-structured floor coverings or slabs, the improvement comprising the steps of:

in a second process stage, subjecting the surface of the laser-structured floor coverings or floor slabs to purposeful hydro mechanical post-treatment, spraying the laser-structured floor covering with liquid, providing at least two spraying operations, spraying the laser-structured floor coverings or slabs for etching parts of the surface of the microcraters and thus enlarging the microcraters, and providing a last spraying operation for at least one of cleaning and neutralizing the surface of the floor coverings or slabs from previous spray liquids.

28. The improvement of claim 26, wherein the hydromechanical post-treatment is only carried out in depressions of the floor coverings or floor slabs.

* * * * *